US006198544B1

(12) United States Patent
Wess et al.

(10) Patent No.: US 6,198,544 B1
(45) Date of Patent: **\*Mar. 6, 2001**

(54) METHOD AND SYSTEM FOR CAPTURING IMAGES FROM A VIDEO TAPE FOR THE PURPOSE OF CREATING A MOTION CARD

(75) Inventors: Raymond E. Wess, Holley; John A. Agostinelli, Rochester; Girish V. Prabhu, Fairport, all of NY (US)

(73) Assignee: Eastman Kodak Company, Rochester, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/056,949

(22) Filed: Apr. 8, 1998

(51) Int. Cl.$^7$ .............................. H04N 1/21; H04N 1/387
(52) U.S. Cl. ............................................ 358/296; 358/450
(58) Field of Search .................... 358/401, 246, 358/471; 359/25, 32, 463, 472; 395/100; 348/96, 97

(56) References Cited

U.S. PATENT DOCUMENTS

| | | | |
|---|---|---|---|
| 3,268,238 | 8/1966 | Finkel | 281/63 |
| 3,538,632 | 11/1970 | Anderson | 40/106.51 |
| 5,276,478 | 1/1994 | Morton | 355/22 |
| 5,404,316 | 4/1995 | Klingler et al. | 364/514 |
| 5,455,689 | * 10/1995 | Taylor | 358/450 |
| 5,697,006 | * 12/1997 | Taguchi | 348/48 |
| 5,737,087 | * 4/1998 | Morton et al. | 358/296 |
| 5,867,322 | * 2/1999 | Morton | 359/619 |

OTHER PUBLICATIONS

U.S. application No. 08/909,789, Morton, filed Aug. 12, 1997.
U.S. applications No. 60/004,556, Morton, et al; filed Sep. 29, 1995.

* cited by examiner

Primary Examiner—Jerome Grant, II
(74) Attorney, Agent, or Firm—William F. Noval

(57) ABSTRACT

A system for forming a motion card from frames of video selected by a user from a sequence of video frames that have been previously recorded on a video tape incorporates a kiosk that contains a video tape player, a processor receives a sequence of video frames from the video tape player, a display is used to display a selected range of video frames received by the processor, and step-by-step interactive instructions for the user for enabling the user to select video frames from the displayed selected range of video frames for preview display is improved by enabling the processing and display of video frames as if they were formed on the motion card so as to provide a high degree of correspondence between the displayed motion card and the to be formed motion card. A viewable simulation of the adjacency effect that will be present in the formed motion card enables the operator to improve the selection of the frames to be used in the formed motion card. Additionally, editing software enables the user to reselect video frames from the selected sequence of video frames so as to effectively change the content of the displayed motion card to meet the user's taste. A printer and a laminator, located in the kiosk or in communication with the kiosk, are used to print the selected frames in an interleaving manner, on a card sheet and for laminating a lenticular sheet over the interleaved printing so as to provide a motion card that replicates the motion image previewed on the display.

7 Claims, 17 Drawing Sheets

| FIG. -2A |
|---|
| FIG. -2B |
| FIG. -2C |
| FIG. -2D |
| FIG. -2E |

FIG. 2

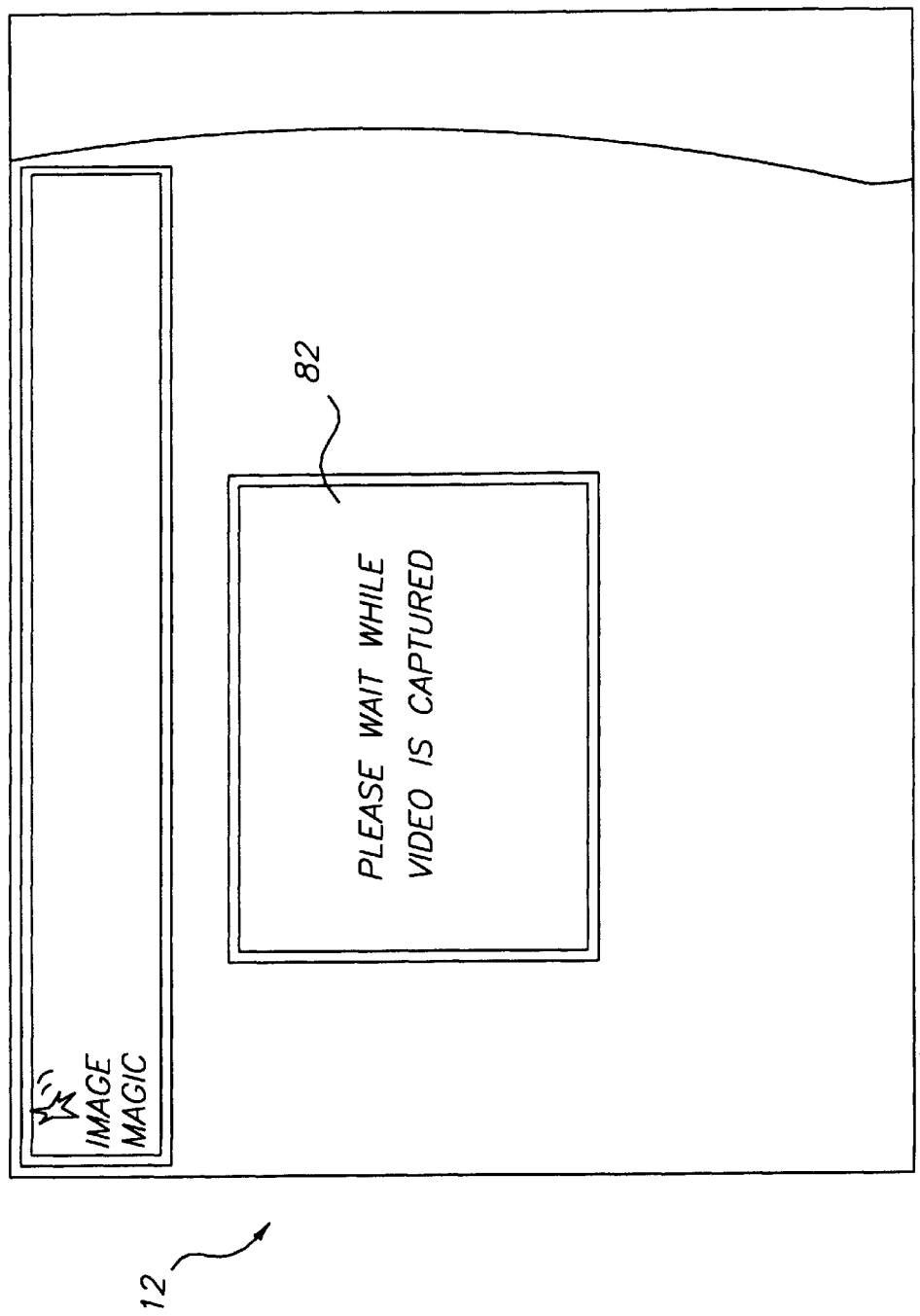

METHOD AND SYSTEM FOR CAPTURING IMAGES FROM A VIDEO TAPE FOR THE PURPOSE OF CREATING A MOTION CARD

CROSS-REFERENCE TO RELATED APPLICATIONS

The present application is related to U.S. application Ser. No. 08/570,259, filed Dec. 11, 1995, by Roger R. A. Morton, et al., and entitled, "Consumer Applications of Motion-Based Hard Copy Imaging," baring a Notice of Allowance dated Sep. 2, 1997, and to U.S. application Ser. No. 08/909,789, filed Aug. 12, 1997, by Roger R. A. Morton, and entitled, "Remote Approval of Lenticular Images."

MICROFICHE APPENDIX

Reference is made to a microfiche appendix which forms part of this specification which includes 1 sheet of microfiche containing 29 number of frames.

The disclosure in the microfiche appendix of this patent document contains material to which a claim of copyright protection is made. The copyright owner has no objection to the facsimile reproduction of any one of the patent documents or the patent disclosure as it appears in the U.S. Patent and Trademark Office patent file or records, but reserves all other rights whatsoever.

1. Field of the Invention

The invention relates generally to the field of manufacturing cards that incorporate image structures that provide a visual motion to portions of the image as the card is tilted, and in particular to systems for generating the motion image cards. Even more specifically, this invention relates to a kiosk containing a user interface which guides a user through a video sequence selection process for selecting from the user's provided video sequences a realistic preview of the motion image card that will be produced as a result of the selection process.

2. Background of the Invention

Motion sequence cards are well known and have been available for an extensive period of time. Generally, these cards are mass produced with each card having an identical sequence of images that when viewed and moved in the proper orientation creates an illusion of motion. Images used on the card can be animated or a collection of still images captured over a period of time. In addition, motion sequence cards contain well known subject matter and are generally used for advertisement, promotional, or collectable purposes for the mass market. Motion sequence cards are made by aligning multiple interleaved images behind a linear lens array commonly called a lenticular lens sheet. Motion can be perceived by viewing the card while tilting it around an axis parallel to the lenticules.

Historically, motion sequence cards have been mass produced with the same sequence of images due to the costs associated in setting up and selecting differing sequences for small production runs. A sequence of image frames containing motion has to be culled for those frames that will provide, first of all the desired motion, secondly the smoothness of the desired motion, and somewhat lastly, the selected number of frames that will fit into their respective positions under the lenticular sheet. Frames of images in motion are generally captured in two forms by the general public, the first is by way of movie film, and the second is by way of a video camera. It would be desirable to have a technique (system) that would enable consumers to produce individual custom motion sequence cards from, e.g., their own video source such as VHS and 8 mm video tapes. The preferred system of the present invention is designed to operate with frames of digital image data irrespective of the means for collecting the images.

The aforereferenced, U.S. patent application Ser. No. 08/570,259, titled "Consumer Applications of Motion-Based Hard Copy Imaging" by Morton, et al., discloses a motion based hard copy imaging system that incorporates an apparatus for selecting, storing, and viewing a series of views from a video sequence. The disclosed system incorporates a programmed processor that accesses, interleaves, and stores the resultant interleaved images.

Systems which produce still images on photographic media from a video tape use VCRs for the purpose of recording the signal. A typical system for creating photographic images from a video may include a computer, printer, and a VCR. Once the signal has been recorded, an image(s) can be printed by electronic means on a photographic media. The same technique can be used to capture and print a sequence of multiple images which when interleaved (spatially multiplexed) and properly arranged behind a lenticular array will create an illusion of motion.

The hardware needed to capture, sequence, and store images for the purpose of creating an image motion card is well understood and readily available. The quality level of a motion sequence card is not as dependent on the hardware used to capture the sequence of images as it is dependent on the method by which the images are selected for recording on the image motion card. It is also desired that the technique by which a sequence of video is captured and selected be incorporated into a kiosk, and that the user interface for the kiosk be easy and intuitive to use.

The present invention addresses the problem of forming custom motion image cards from a sequence of images provided by consumers from their home video tapes in an easy, high quality, and inexpensive manner.

SUMMARY OF THE INVENTION

The present invention is directed to overcoming one or more of the problems set forth above. Briefly summarized, according to one aspect of the present invention, a system for forming a motion card from frames of video selected from a sequence of video frames that have previously been recorded on a VCR tape, comprising a kiosk comprising; a video tape player, a processor for receiving a sequence of video frames from the tape player, a display for previewing a selected range of video frames received by the processor, and an interactive means for enabling a user to select video frames from the displayed selected range of video frames for display as if formed on a motion card, and editing means used in conjunction with the processor for enabling the user to reselect video frames from the sequence of video frames for display as if formed on a motion card; and a printing means for printing the selected frames in an interleaving manner on a card sheet and for applying a lenticular sheet to the card sheet or alternately printing directly to the back of the lenticular sheet so as to provide a motion card that replicates the motion image previewed on the display.

The preview feature of the present invention accurately represents and displays a selected motion sequence as it will appear in a fabricated motion image card so that edits in the sequence may be made by the user/customer to optimize the utility of the motion image card. It is also a natural feature of motion image cards that image quality decreases as the play time represented in the motion card increases. A user interface in conjunction with a preview feature helps the user to trade off play time for image quality to arrive at the optimum motion sequence that is to be recorded on the motion card.

These and other aspects, objects, features, and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the following advantages:

Provides a truer viewable representation of the motion sequence selected by the user prior to its being formed on a motion card.

System enables the formation of individualized motion cards with a user friendly interface that is part of a kiosk.

The customized motion cards are formed and made available at the kiosk's location within a short time from the users selection of the appropriate sequence.

BRIEF DESCRIPTION OF THE DRAWINGS

FIG. 2 is a map illustrating the correct assembly of Figs. 2A–2E.

FIGS. 5A, 5B, and 5C illustrate screen displays occurring during Step 3 of the flow diagram illustrated in FIG. 2A;

To facilitate understanding, identical reference numerals have been used, where possible, to designate identical elements that are common to the figures.

DETAILED DESCRIPTION OF THE INVENTION

Figure 1:
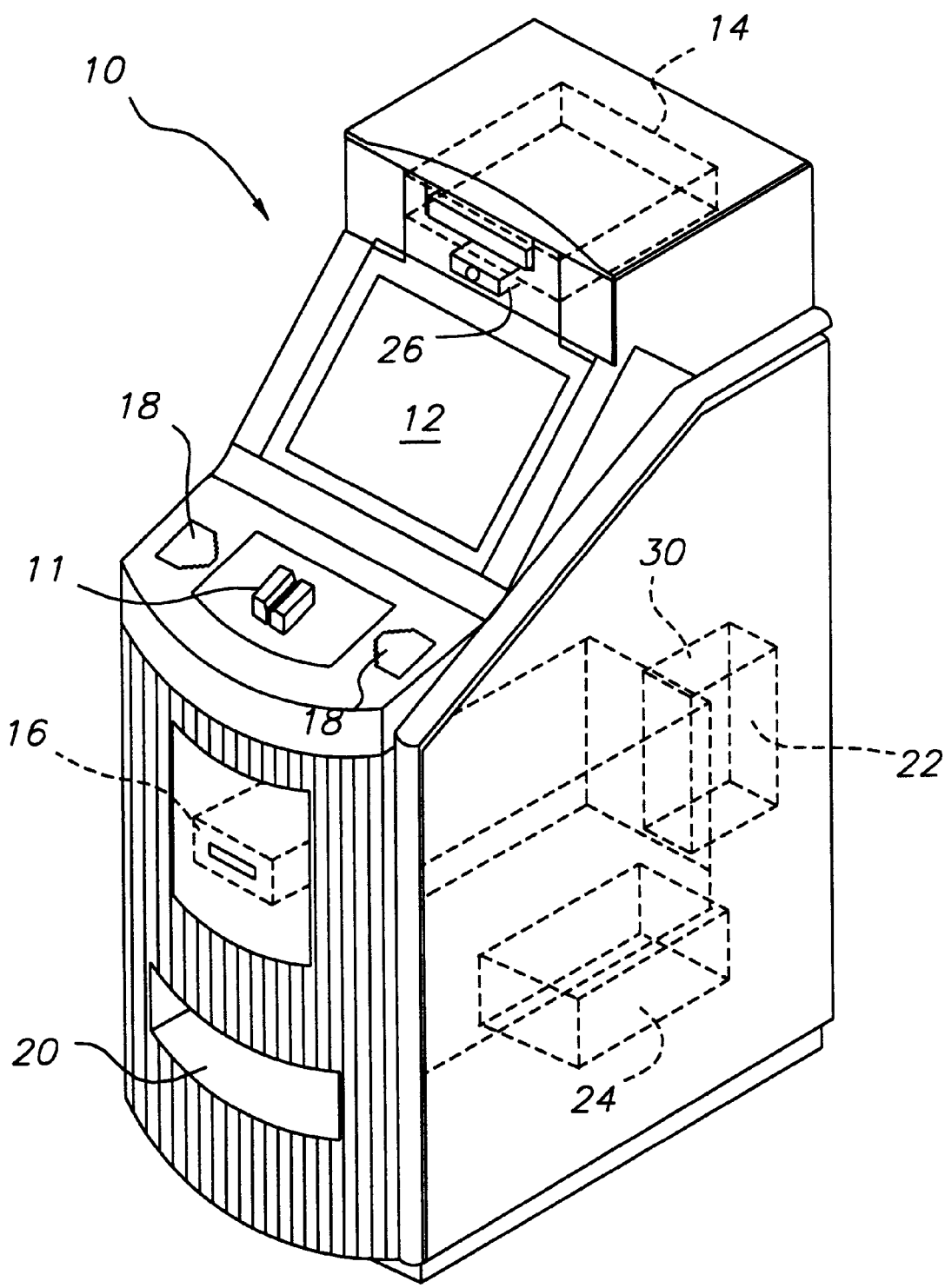
FIG. 1 is a perspective diagram of a preferred kiosk-based system according to the present invention.

Referring to FIG. 1, the kiosk based system 10 incorporates a touch screen display 12 for user interaction, a video tape player 14 for receiving a tape such as an VHS or a 8 mm tape, a receipt printer 16 for providing the user with a transaction record, along with a motion card delivery slot 20 and a set of speakers 18 which optionally provide the user with audio instructions. Internal to the kiosk 10 is a processor (CPU) 22 that is connected to a printer 24 that is fed with blank lenticular cards 30 that are cut or molded to the length and width of the desired motion image card. One printer that will perform adequately in the present system is manufactured by Panasonic and bears their number P-M1000. That printer is a dye sublimation thermal transfer printer that will print color images onto a lenticular card thus forming motion image cards. The kiosk 10 also may incorporate a credit card reader 11 for obtaining payments for the motion sequence cards. Kiosk 10 could alternately use a dollar bill acceptor (dba) such as produced by Cashcode, Inc. Although the printer 24 and the associated supply of cards, etc., is shown located within the kiosk 10, alternately they may reside at a remote central location that is accessed over a communication network or the printer be located locally servicing more than one kiosk. Another variant is to have the images stored at the kiosk location on a removable storage medium such as a floppy disk that is picked up at the end of the day by a service person and delivered to a central location where the printer is located. An electronic camera 26 may be added to the kiosk to capture images of customers. The camera 26 may be mounted integral with the kiosk or it may be tethered so that a customer can scan the immediate area capturing motion frames of friends and relatives.

Figure 2A:
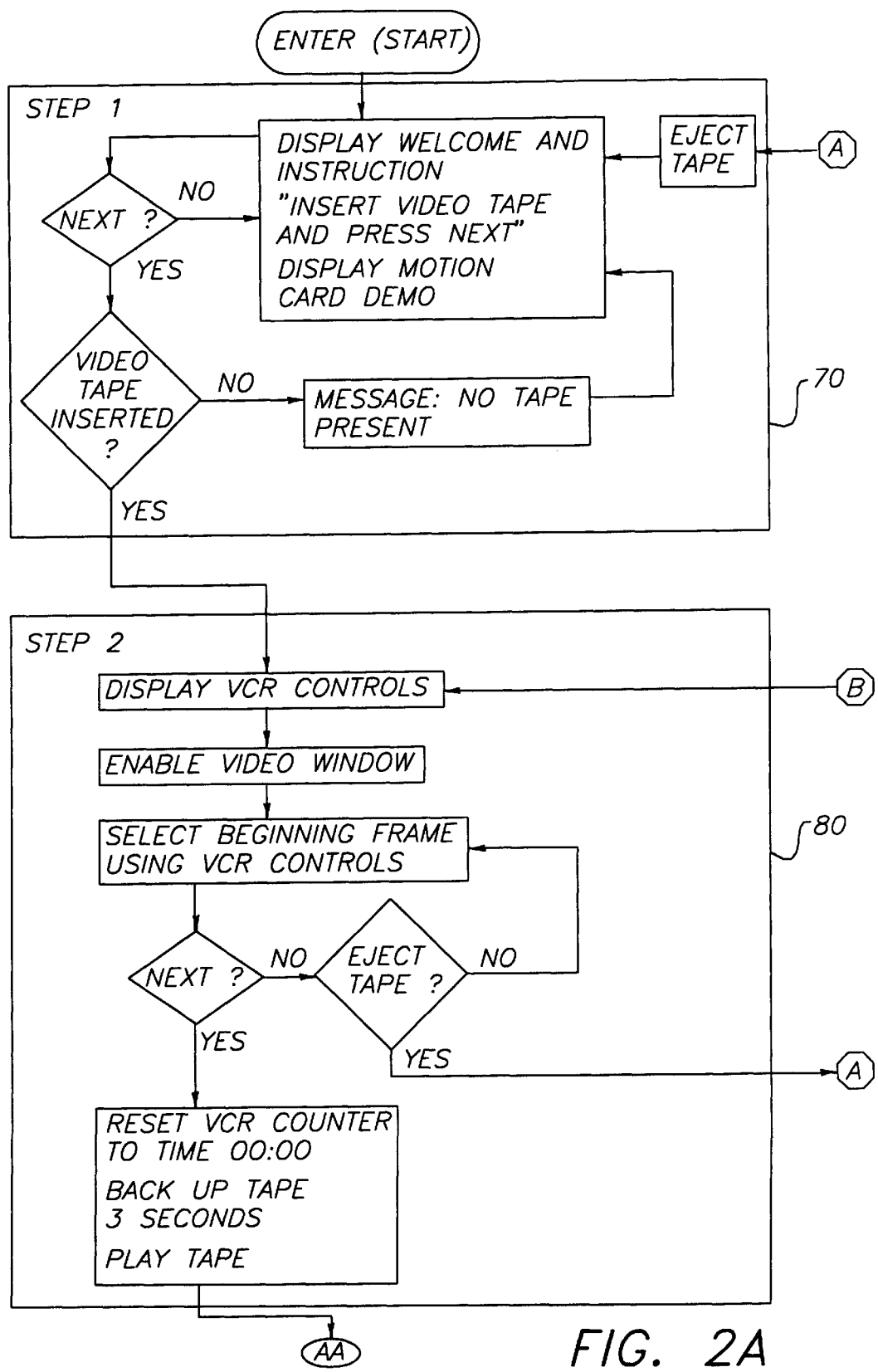
FIGS. 2A through 2E illustrate in flow diagram form the preferred operating method for the kiosk-based system of FIG. 1.
Figure 2B:
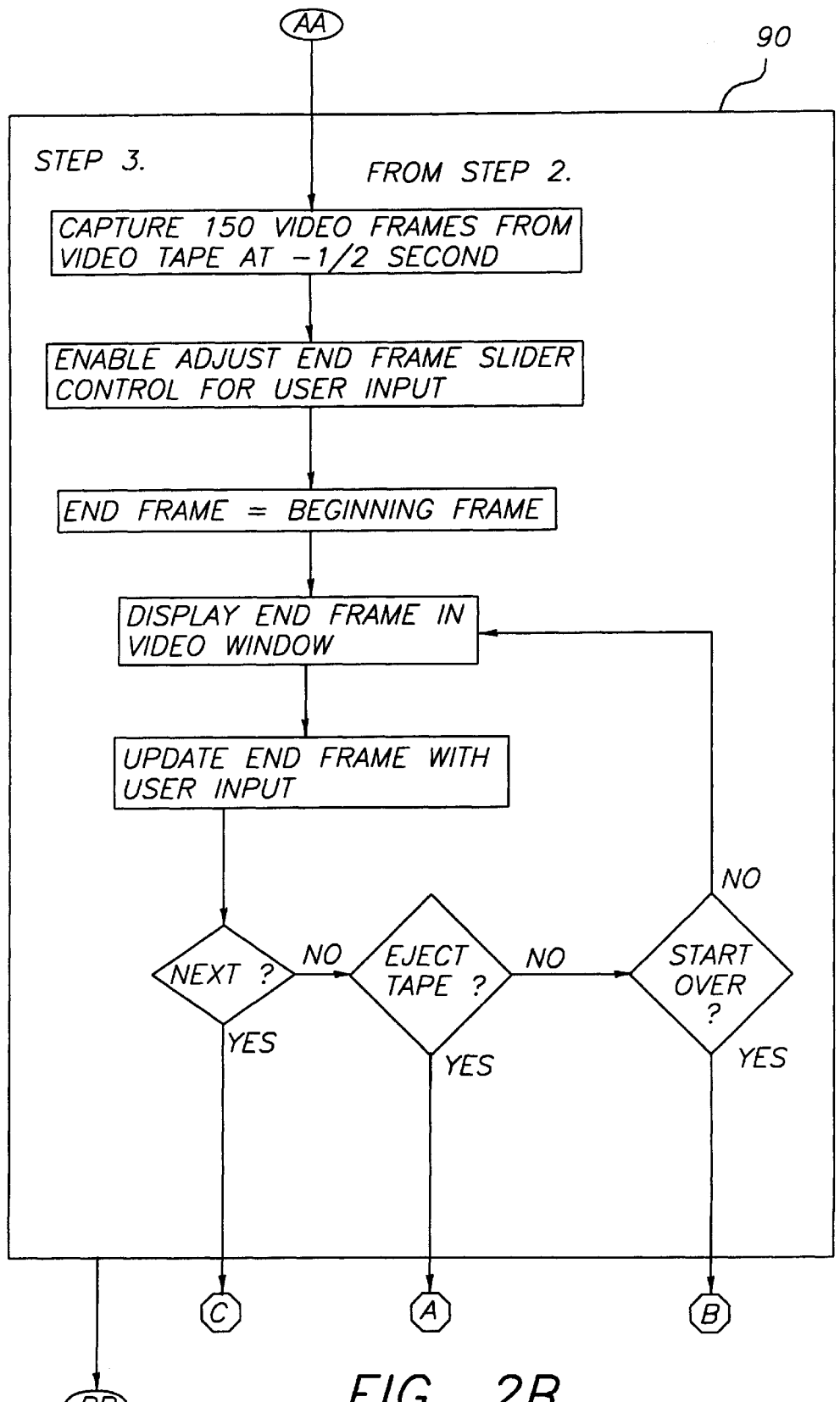
Figure 2C:
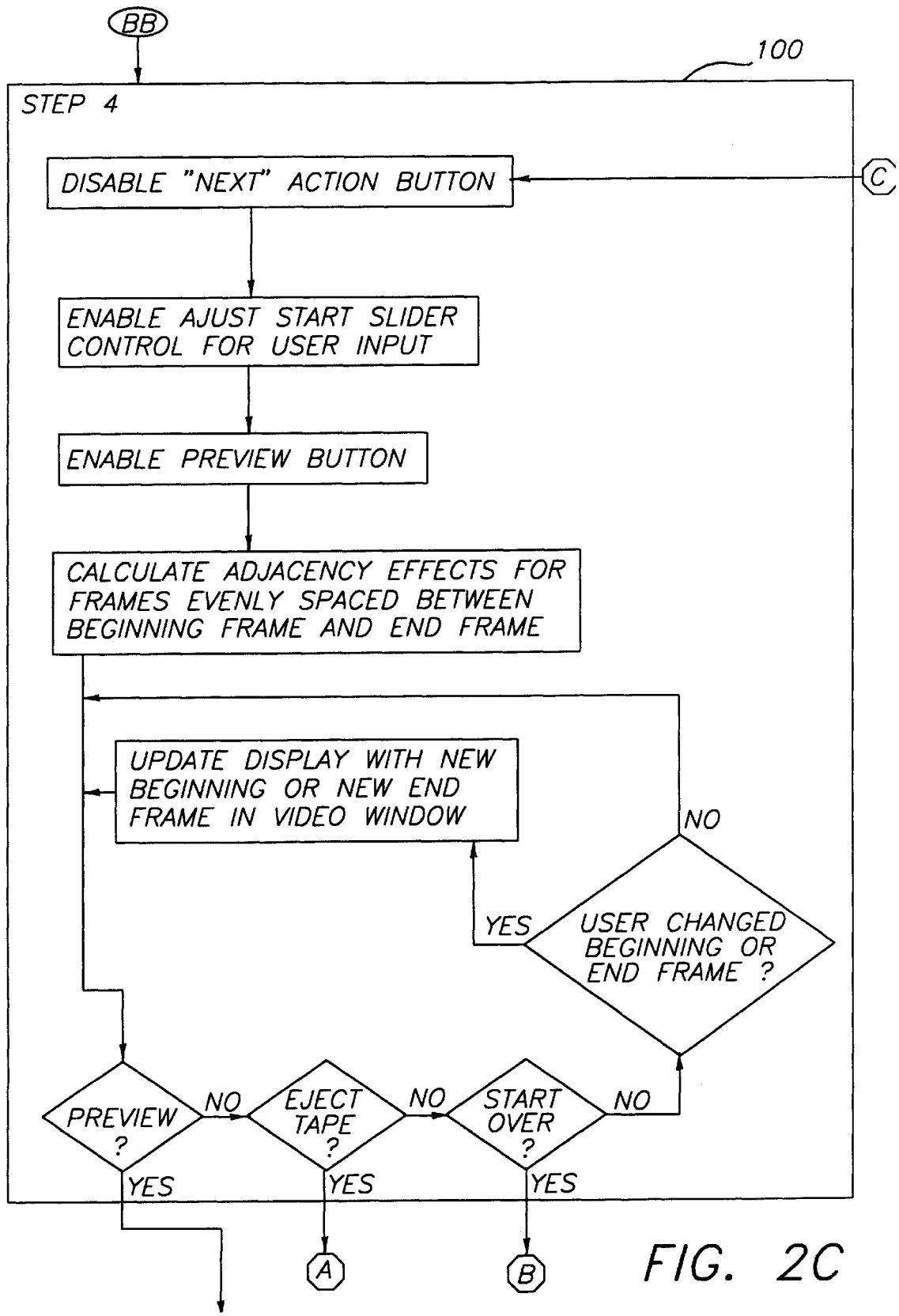
Figure 2D:
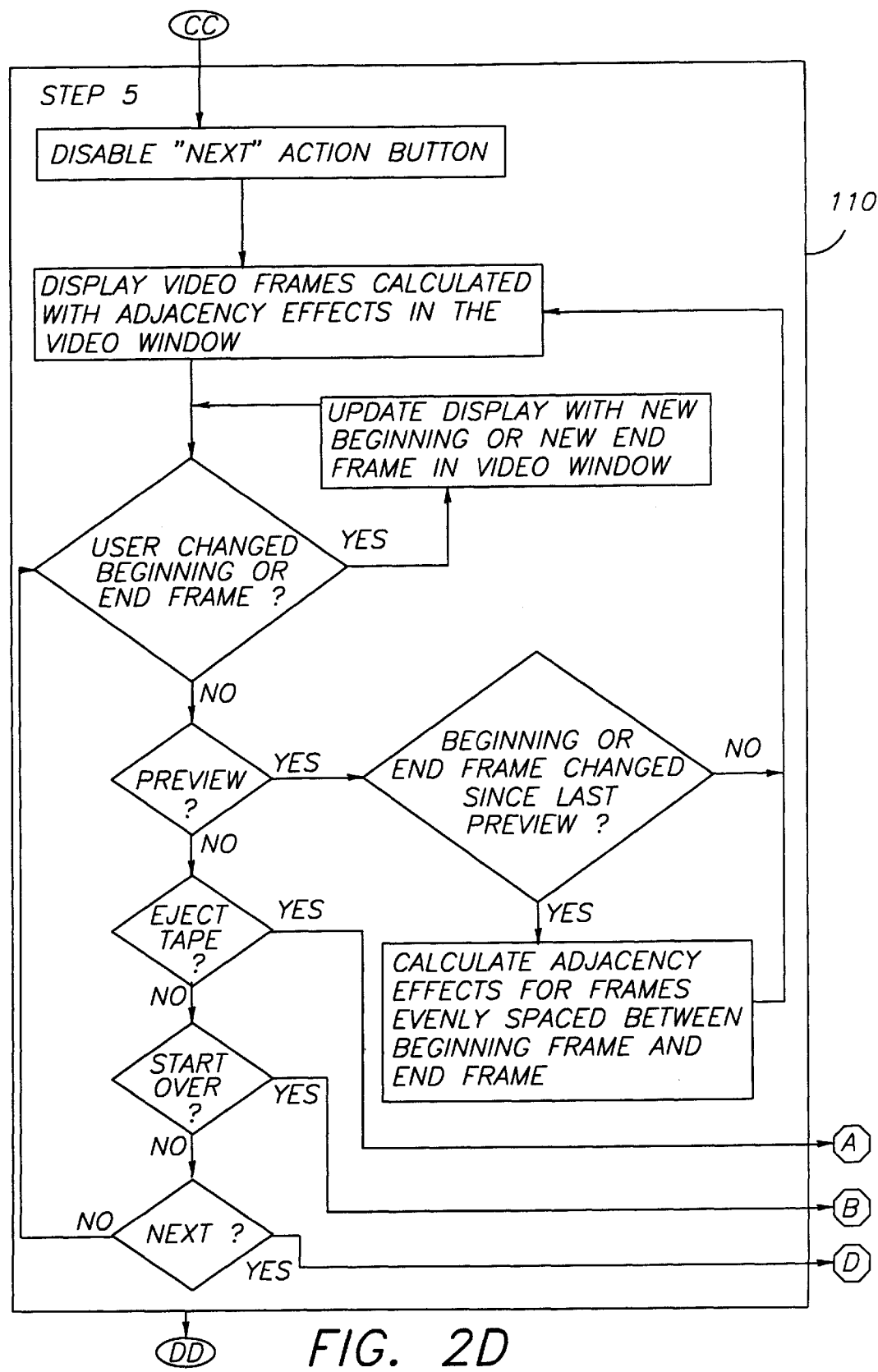
Figure 2E:
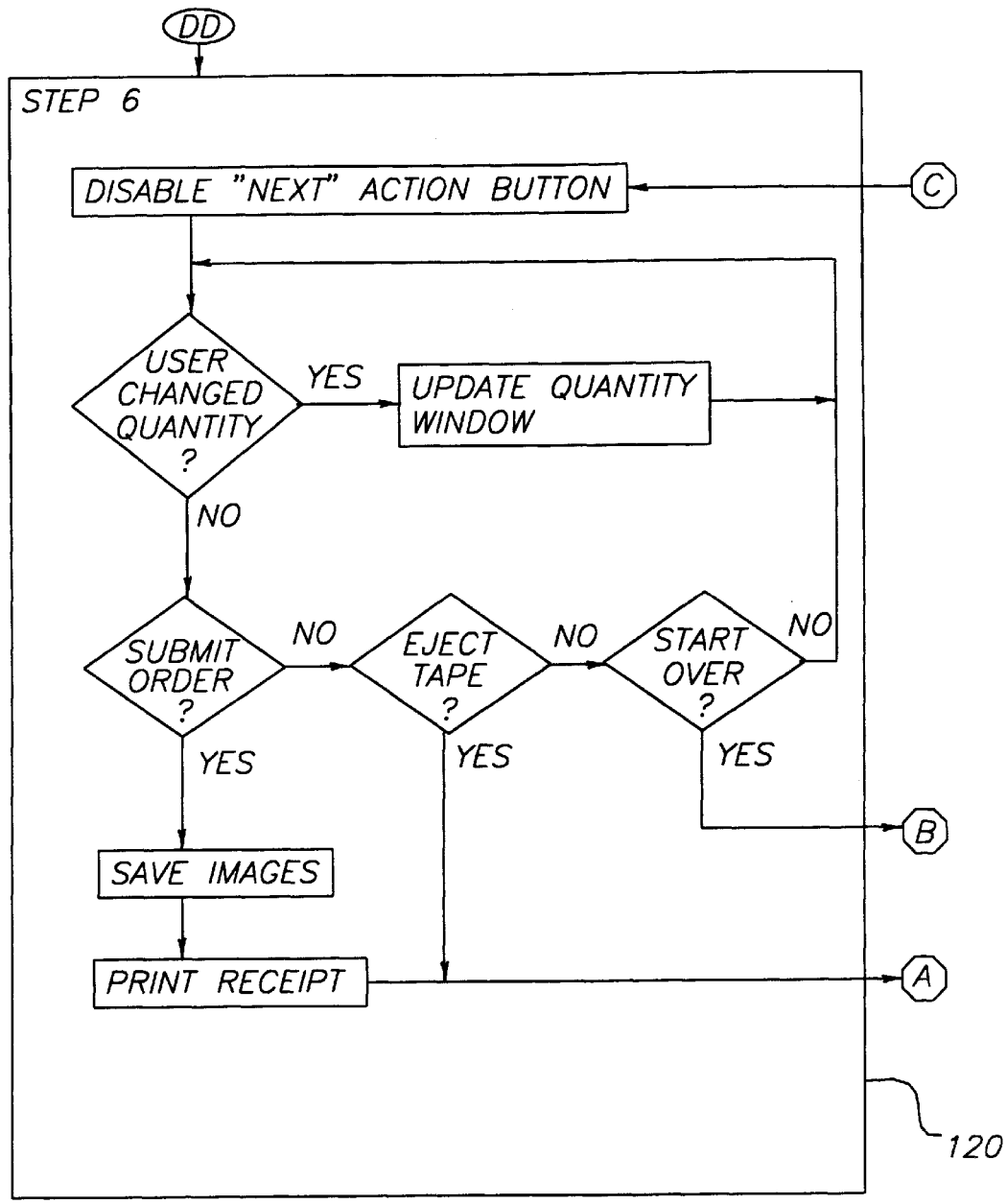
Figure 3A:
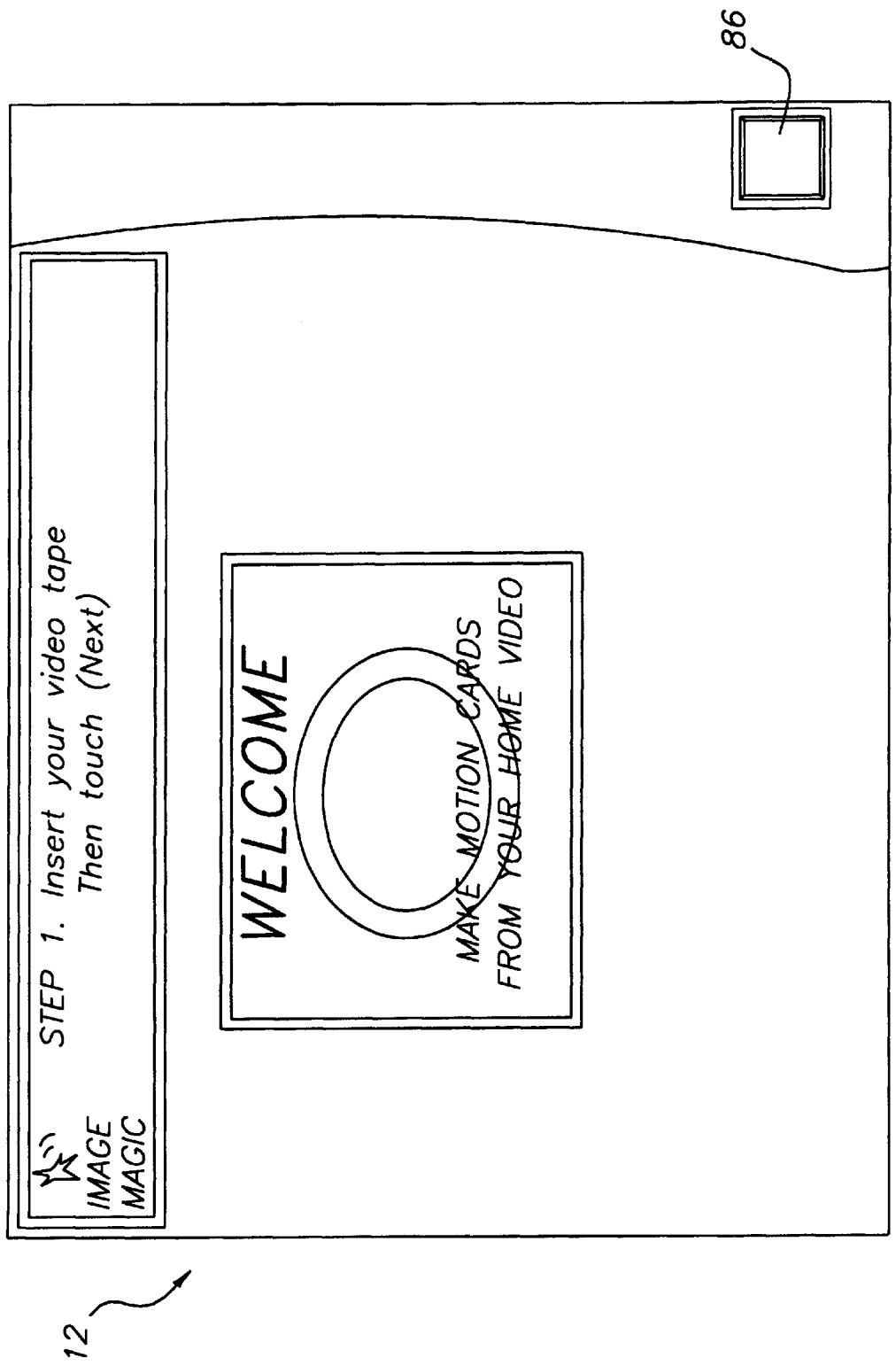
FIGS. 3A and 3B illustrate screen displays occurring during Step 1 of the flow diagram illustrated in FIG. 2A.
Figure 3B:
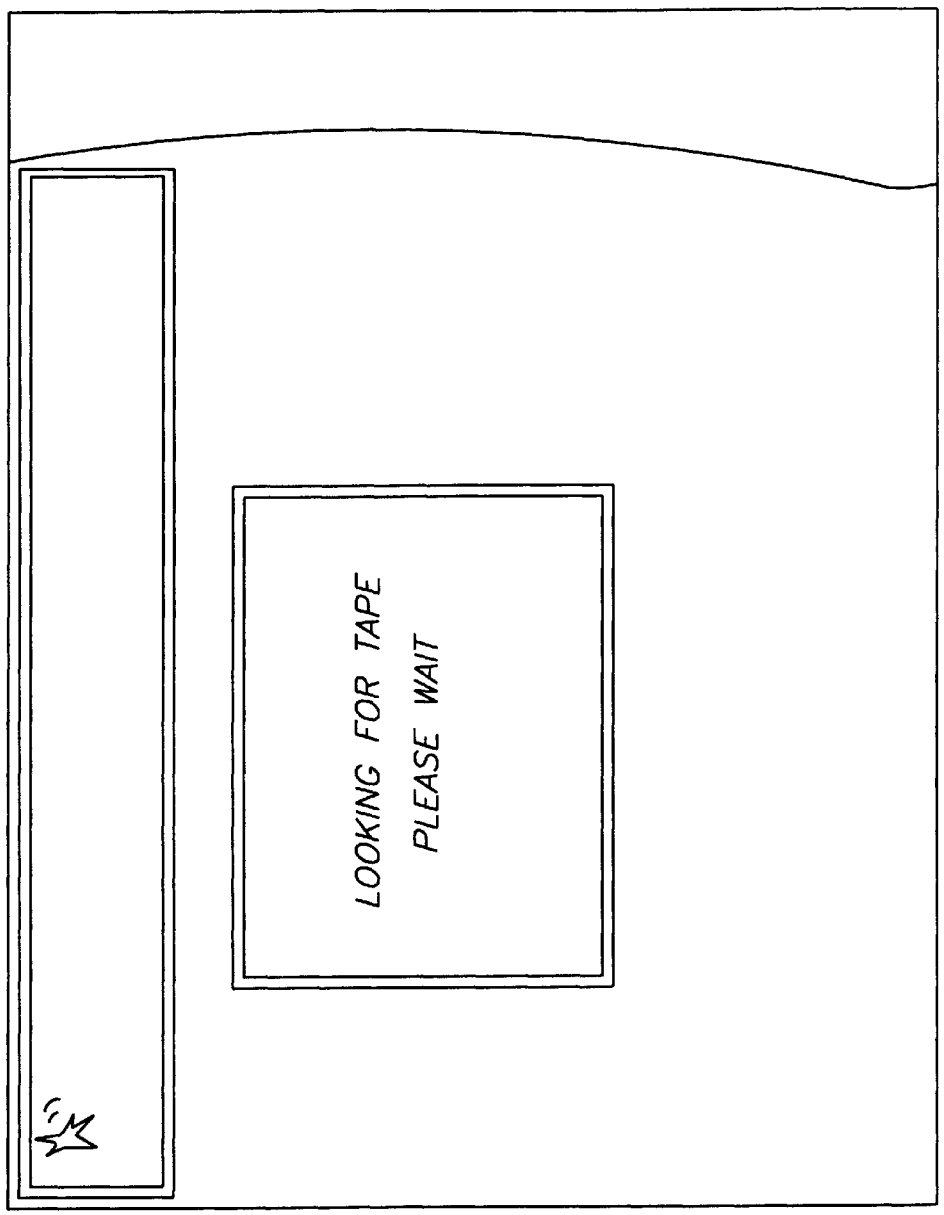

A method for capturing a high quality sequence of video from a video tape for a motion card in a kiosk is described by the flow chart of FIGS. 2A through 2E which chart references a number of screen images from the user interface (FIGS. 3A–3B). The process for capturing, previewing, selecting, and forming a motion image card is accomplished in six steps.

Referring to FIG. 2A, the first step, per block 70, welcomes the user to the kiosk and instructs the user to insert a video tape into the kiosk VCR. Once a video tape has been inserted and detected by the kiosk the user interface proceeds to step 2, per block 80. A screen shot corresponding to step 2 is illustrated in FIG. 4.

Figure 4:
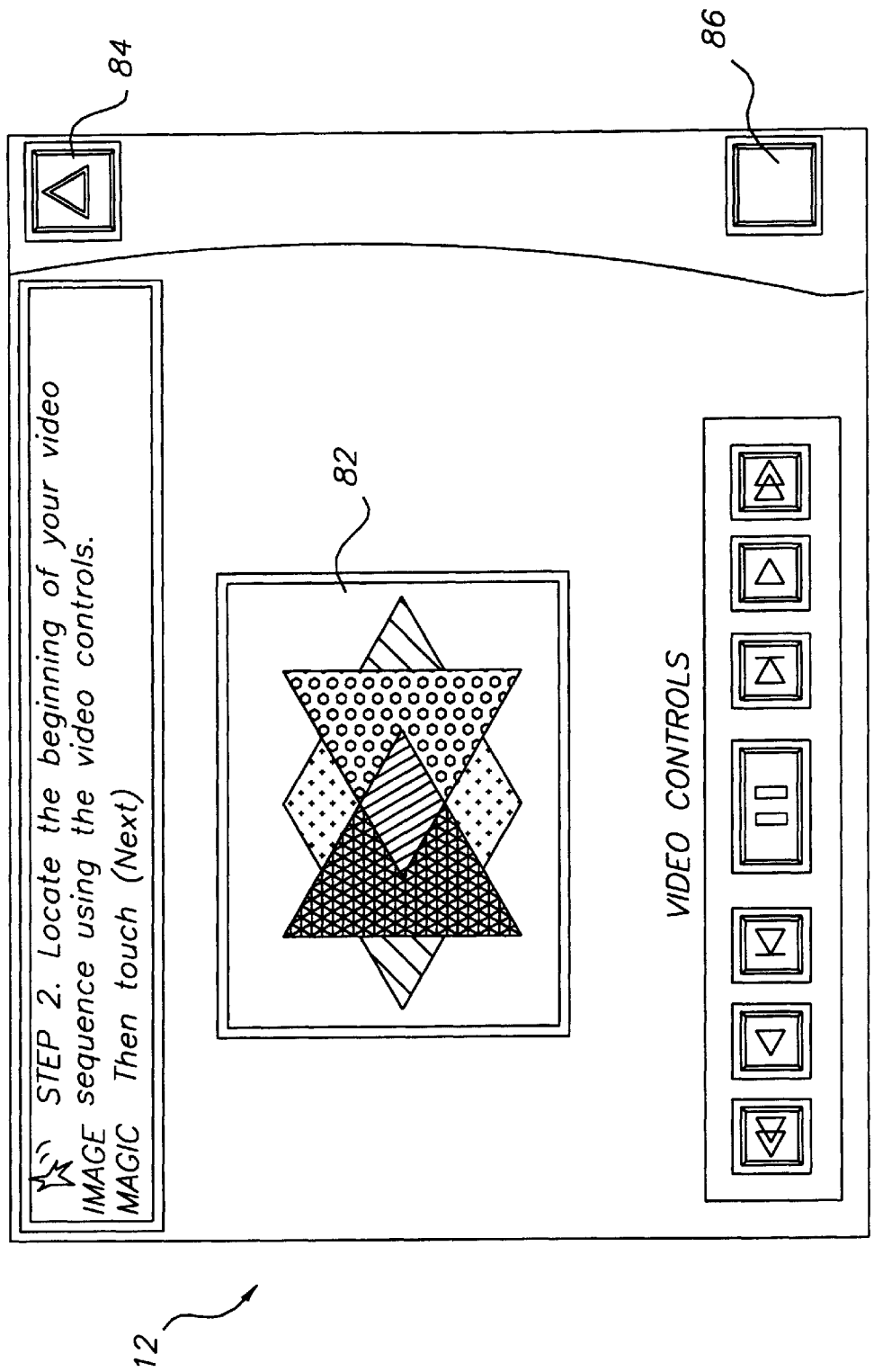
FIG. 4 illustrates the screen display occurring during Step 2 of the flow diagram illustrated in FIG. 2A.

In step 2, standard VCR controls are displayed on the touch screen display 12 (see FIG. 4). The customer uses the displayed VCR controls to select the beginning of the video sequence that they wish to have transformed into a motion card. The standard VCR controls provided include: rewind, previous frame, pause, next frame, play, and fast-forward. A non-standard VCR control is also provided for reverse play. A video window 82 acts as a display to help the user navigate through the video tape in order to locate the beginning of the desired sequence. Two action buttons 84 and 86 are provided to the user to eject and exit the session or to continue to the next step. The Eject and Exit button, 84 is provided to the customer in every step so that the customer can end the session at any time. Once the start frame of the video sequence has been selected, the Next button 86 causes the user interface program to proceed to step 3, per box 90 of FIG. 2B. Between step 2 and 3, the user interface program sets the kiosk VCR counter to count "00:00" to establish the start frame count of the beginning frame at count "00:00." The user interface program also reverses the video tape in the kiosk VCR to several seconds prior to the beginning frame and then instructs the kiosk VCR to begin to play. At –0.5 seconds (½ second before count "00:00"), the kiosk begins to record 150 frames of video (5 seconds). During this interval, the customer is instructed to wait while the kiosk captures and processes the video, as reflected by the touch screen display shown in FIG. 5A.

Figure 5B:
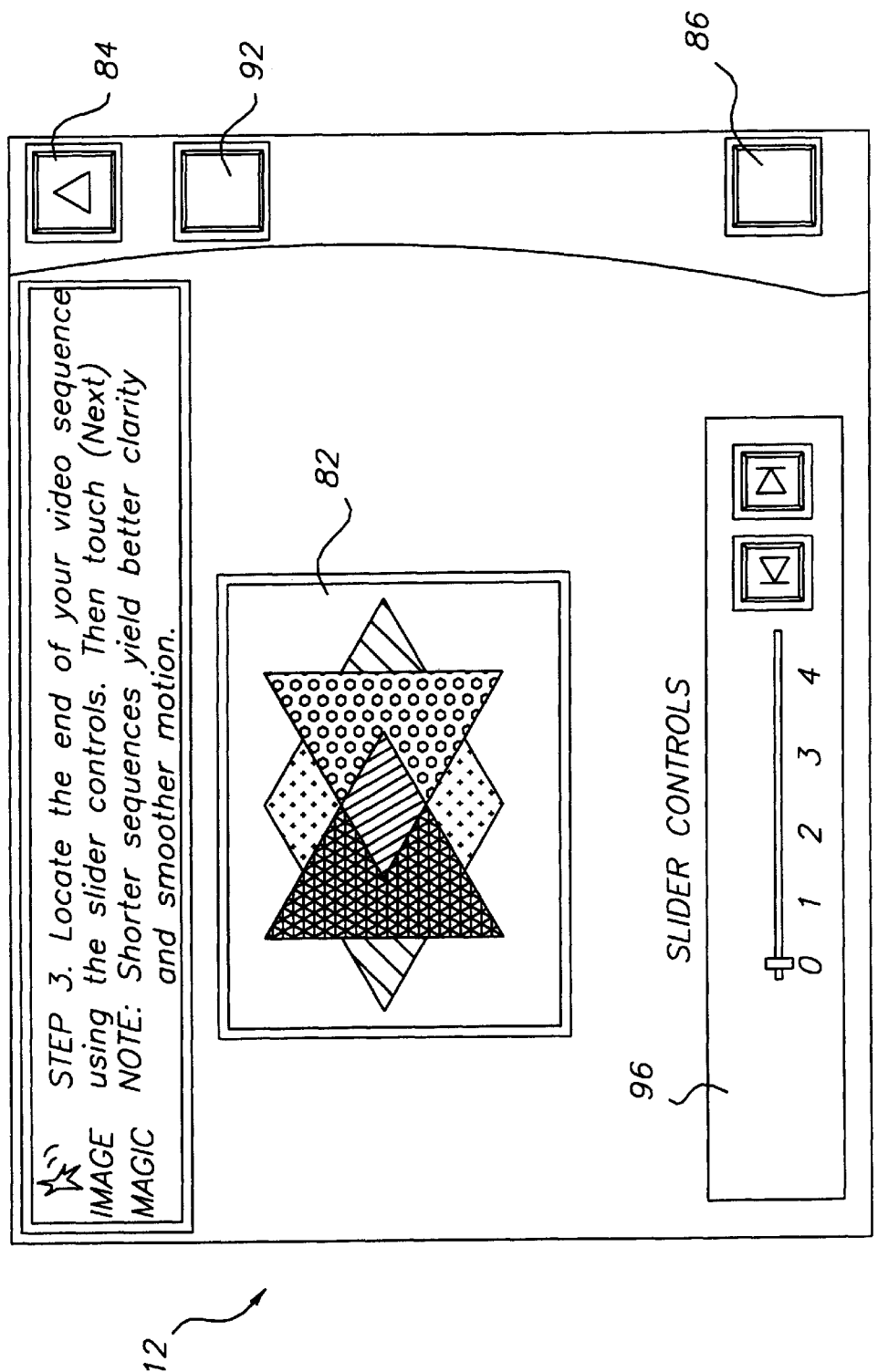
Figure 5C:
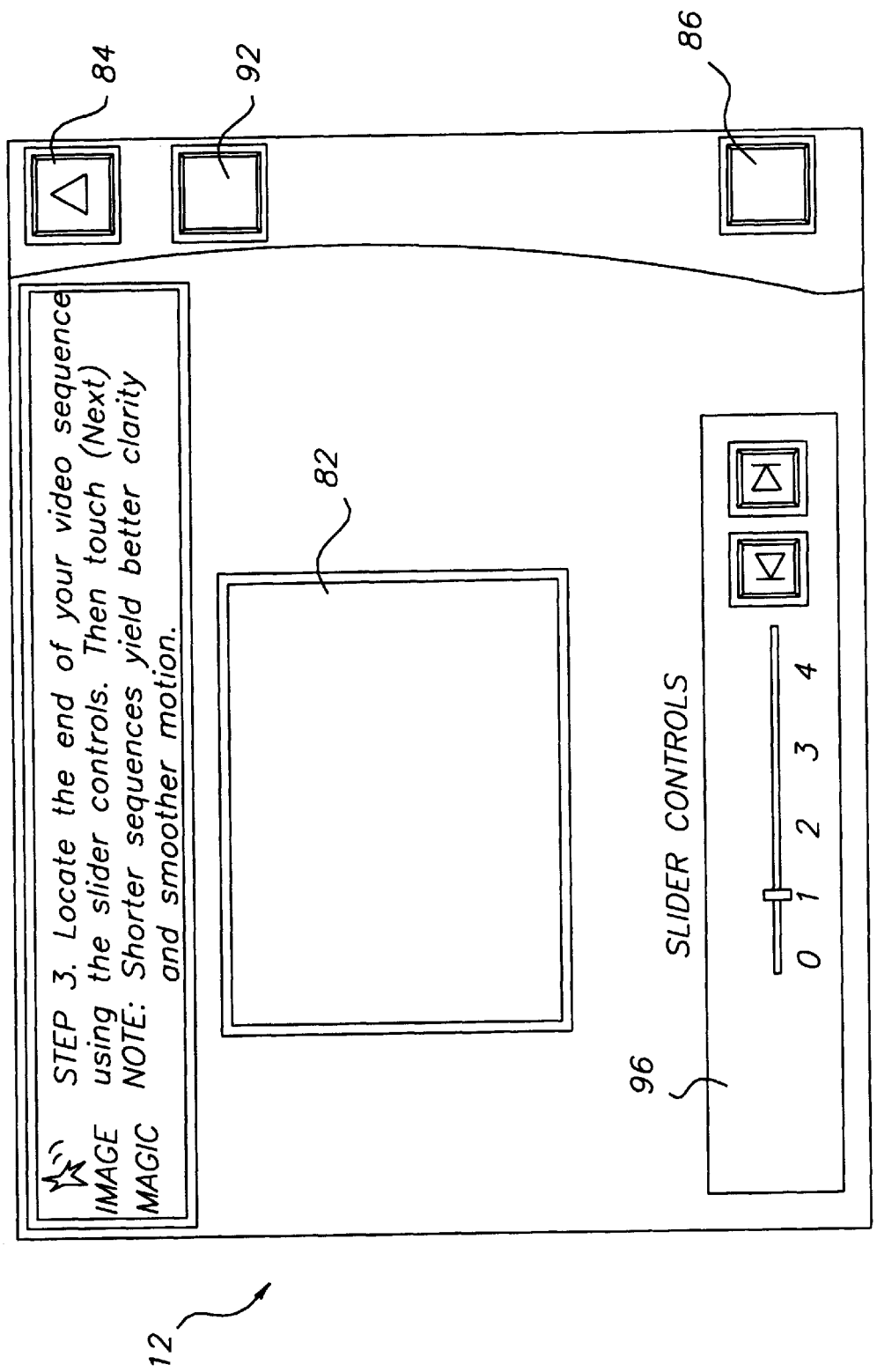

Step 3, per block 90, and as reflected in the touch screen displays of FIGS. 5B and 5C instructs the customer to select an end point for the sequence on the motion card. The screen consists of a slider control 96, and a Start Over button 92 which allows the customer to start over in addition to the Eject and Exit button 84 and Next button 86. The first frame that appears on the video window 82 is the beginning frame that the user selected in step 2. The Start Over button 92 always returns the customer to the beginning of step 2. Step 3 has two primary functions. First, step 3 forces the customer to scroll through the captured video to verify the contents.

Second, step 3 teaches the customer how to use the slider control to scroll through the captured video. Once the end of the sequence has been established, the user interface program progresses to step 4 of FIG. 2C when the Next button 86 is pressed.

Figure 6A:
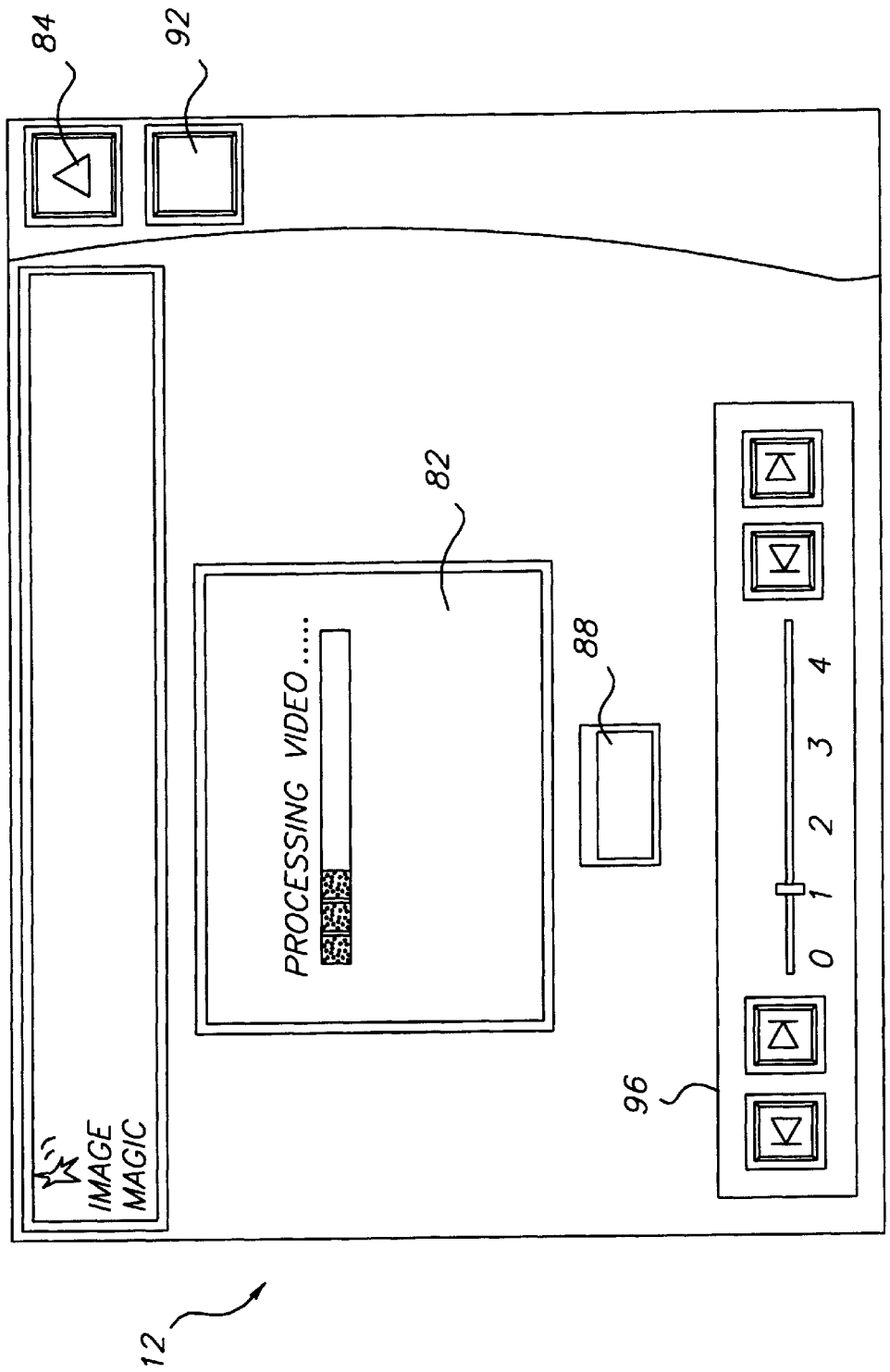
FIGS. 6A and 6B, illustrate screen displays occurring during Step 4 of the flow diagram illustrated in FIG. 2B.
Figure 6B:
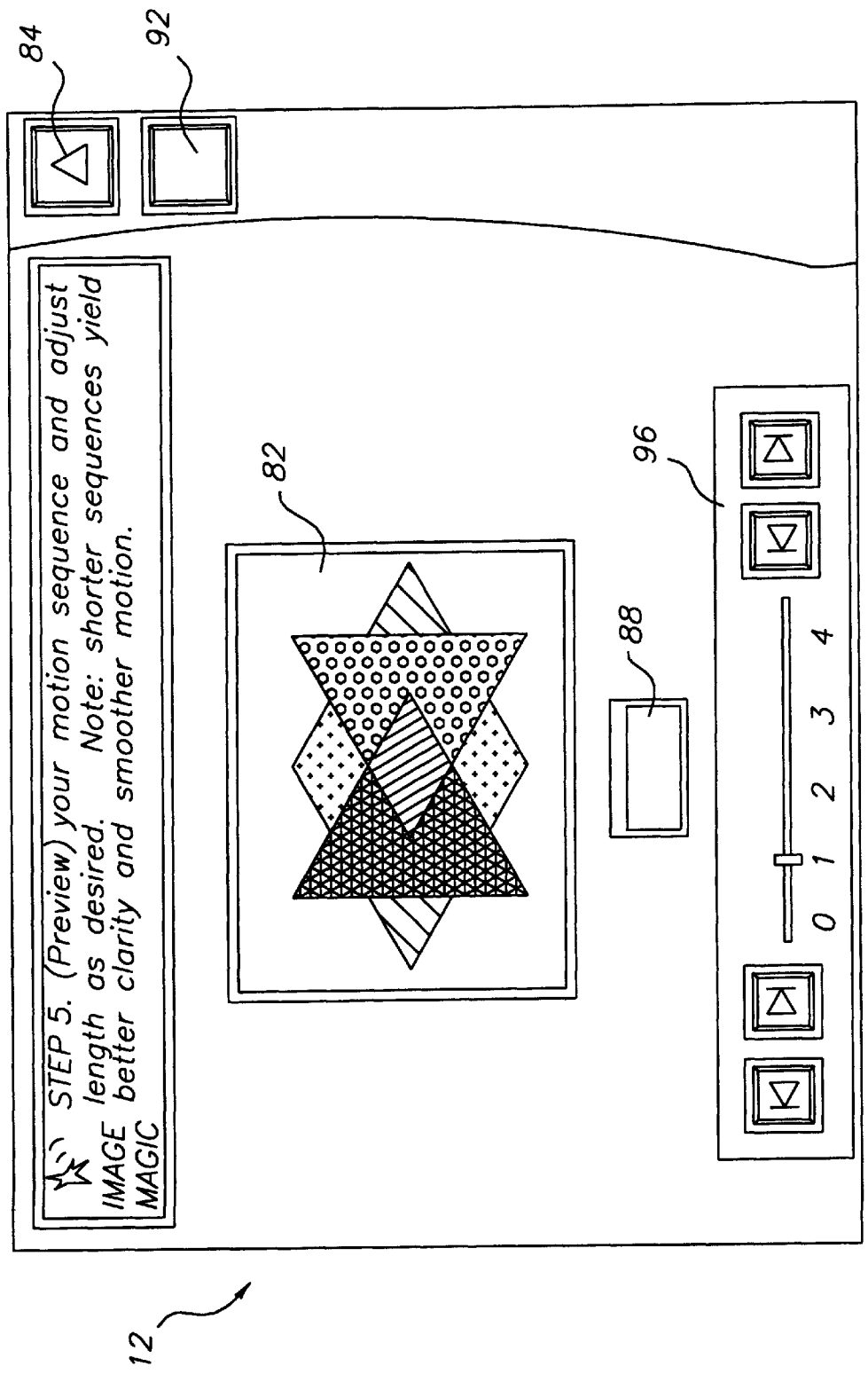

Step 4, per block 100 of FIG. 2C, and per the represented screen displays of FIGS. 6A and 6B, provides the user with a simulation of the final motion sequence card, slider controls for adjusting the beginning and end of the motion sequence and a Preview button 88 for viewing the motion sequence in addition to the Eject and Exit and Start Over buttons, 84 and 92 respectively. Step 4 is the only step which does not include the Next button 86. The absence of the Next button 86 forces the user to use the Preview button 88 before advancing to the next step.

The slider controls 96 enable the user to adjust the beginning of the motion sequence up to ½ second before the selected beginning in step 2, and up to approximately 4 seconds beyond the beginning frame selection. Step 4 is preceded by the user interface program selecting a sub-sample of temporally evenly spaced frames between the user established start and end frames, and calculating image adjacency effects based on the temporally subsampled selection for the purpose of presenting a realistic preview for step 4. At this point a discussion of adjacency effects is appropriate. In viewing motion cards individual frames are not viewable without some overlap of adjacent views. Typically from 3 to 7 views are overlapped for any particular orientation of the card with respect to the observer. Adjacent overlapped views are generally detrimental to perceived image quality. Moreover, as the difference between adjacent images represented in the adjacent views increases, perceived image quality decreases. Large differences between adjacent views occur, for example, when the original motion is very rapid, or when the video is temporally sampled at a low rate (many frames skipped between those saved). It is preferred that the preview be constructed in such a way as to show the customer the effect of adjacency that will appear on the manufactured motion image card when it is tilted. The process of temporally subsampling the video segment, and the adjacency effects are recalculated every time the user changes either the beginning frame or end frame of the motion sequence. The subsampled motion sequence is displayed in the video window along with adjacency effects when the Preview button 88 is pressed. A progress bar in the slider control 96 indicates the length and temporal position of the selected motion sequence during preview.

Figure 7:
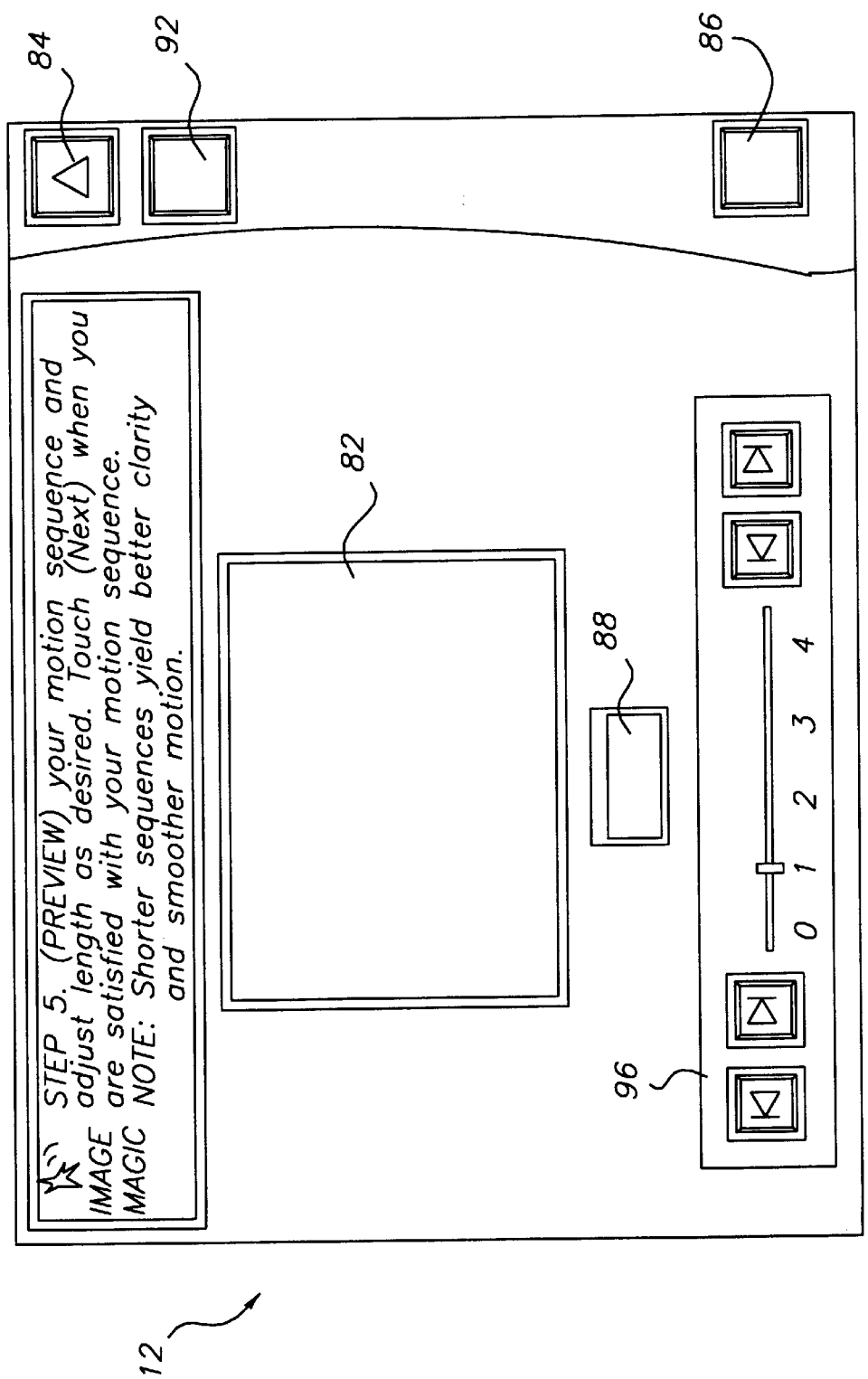
FIG. 7 illustrates the screen display occurring during Step 5 of the flow diagram illustrated in FIG. 2B.

Step 5, per block 110 of FIG. 2D, and per the screen display of FIG. 7, is initiated when the Preview button 88 in step 4 is pressed the first time. The purpose of step 5 is to prohibit the user from moving on to the final step from step 4 without viewing the motion sequence. The difference between step 4 and step 5 is the presence of the Next button 86.

Figure 8:
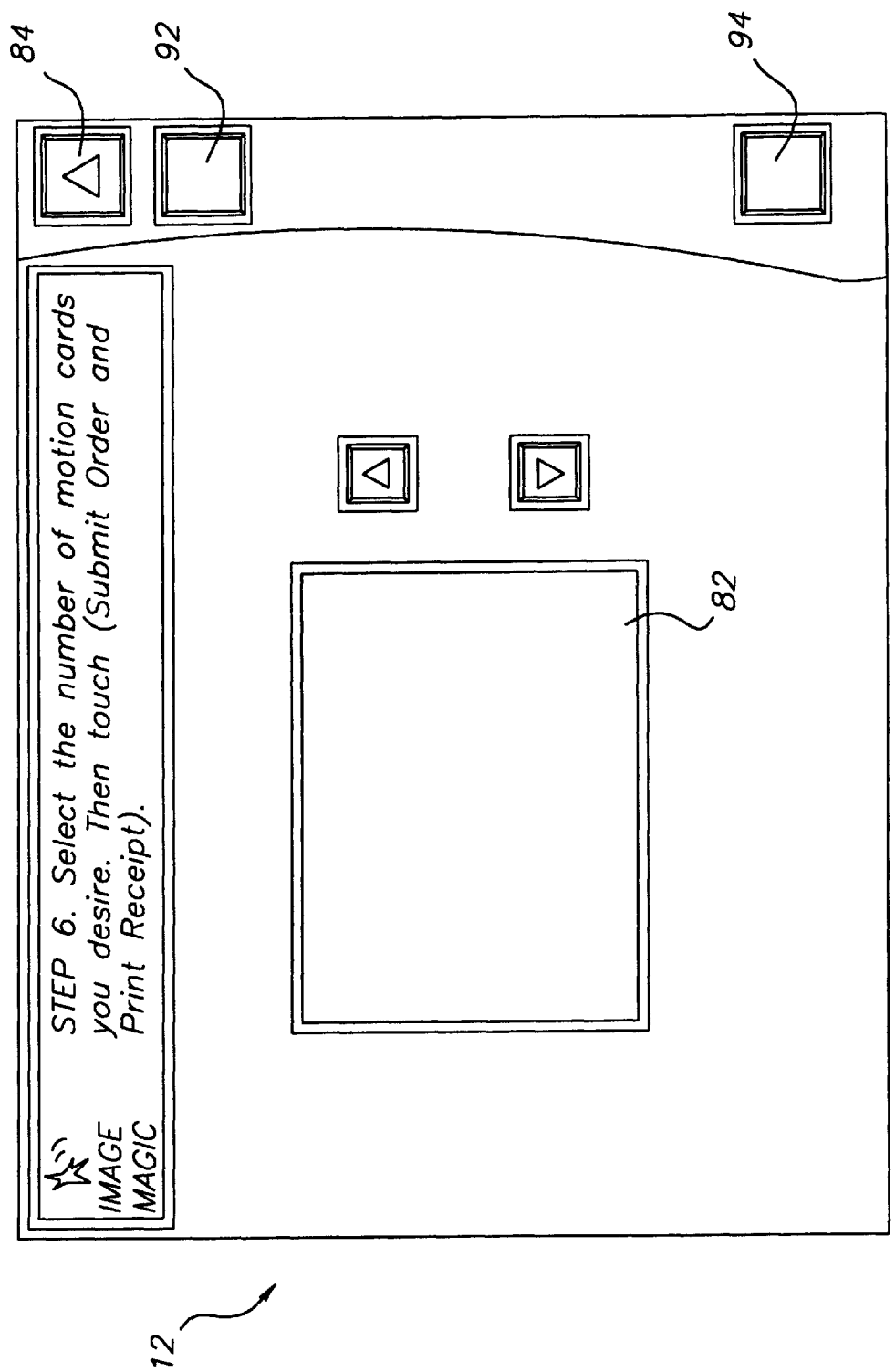
FIG. 8 illustrates the screen display occurring during Step 6 of the flow diagram illustrated in FIG. 2C.

Step 6, per block 120 of FIG. 2E, and per the screen display of FIG. 8, provides a means for input from the user for the number of motion cards desired. The Next button 86 now used to submit the order. Once the Submit Order button 94 has been pressed, the motion sequence is saved to a magnetic drive within the kiosk, a receipt is printed for the customer's records, and the customer's video tape is ejected from the kiosk VCR. For on-site printing, the image data can be sent to a printer directly. Each of these actions is accompanied by an indicator within the video window on the kiosk.

Returning to the subject of the preview function and specifically adjacency effects, the preview is constructed in such a way as to show the user the effect of adjacency on the motion image viewed when observing the tilting motion card. The adjacency can be modeled by use of the equation below to calculate a new set of images from the captured image files, wherein each image of the new set is a linear combination of the captured set. The motion card with adjacency effects included is simulated by playing in sequence the new set of images on the video screen. The nth image of the new simulated set is give by:

$$Is_n = \sum_{m=-j}^{+k} \alpha_{n-m} I_{n-m} \qquad \text{Equation 1}$$

where $I_{n-m}$ is the (n-m)th image of the captured sequence and the $\alpha_{n-m}$ is a coefficient that describes fraction of the (n-m)th image that contributes to the image as it is actually viewed when attempting to view the nth image. The coefficients $\alpha_{n-m}$ depend on the degree to which individual views are resolved, and are influenced by both the linewidth in the recorded interleaved image and by the optics of the lenticular screen. The coefficients $\alpha_{n-m}$ are set to match the superimposed images actually observed in a motion card. In general, j=k, however, there can be asymmetry in line spread function as viewed by an observer through the lenticules, in which case the actually observed motion sequence would more accurately be simulated by having j not equal to k, and with the $\alpha_{n-m}$ representing the asymmetry as well. It is desirable, though, to keep the simulation as computationally simple as possible without significantly affecting the fidelity of the simulation. Experiment has shown in fact that setting j=k=1 and $\alpha_{n-1}=\alpha_{n+1}$ gives a good simulation. Then $$Is_n = \alpha_{n-1} I_{n-1} + \alpha_n I_n + \alpha_{n-1} I_{n+1} \qquad \text{Equation 2}$$

Further it has been found that the coefficients $\alpha_n$ and $\alpha_{n-1}=\alpha_{n+1}$ can be held constant independent of n with good results. It has been found that the values for the coefficients $\alpha$ depend on whether the motion card is of the transmissive or reflective type. It would be preferred therefore, that if a choice of type were to be offered for sale in the marketplace, that the simulation for the transmissive and reflective types match their respective cards. Thus the customer using the user interface would see different simulations of their cards depending on which type they choose to order.

Other preferred attributes of the motion card preview include a resampling of each of the n displayed images to match the lenticular pitch. Specifically, for a card having a cross-lenticular (vertical) size given by Y inches and a lenticular spatial frequency of N lenticules/inch, then the displayed images should be characterized by N×Y pixels in the cross-lenticular (vertical) direction. This pixel number will generally be the total number of lines in the interleaved image divided by the number of views. Preview image pixel count in the direction parallel to the lenticules should preferably match the pixel count of the card in that direction.

To facilitate the intuitive connection between the preview and the actual motion card viewing, it is preferred that the preview depicts an image of a human hand holding a card with the hand rocking the card as in actual viewing. More preferably, the height of the card in the preview as well as the apparent lenticular pitch vary according to the card tilt at each point in the sequence.

Another preferred feature of the user interface, including the preview, is the incorporation of a scene balance algorithm, preferably an automatic one. Scene balance algorithms are well known and are useful in accommodating for the range of lighting conditions and camcorder performance that affect contrast and brightness in video imagery. Scene balance algorithms can also improve the tone scale of photographic images used for lenticular multi-image cards.

An improvement to the user interface can be achieved by calling attention to the written instructions which are part of each screen. A preferred method for accomplishing such drawing of attention is to flash the text corresponding to the instructions as each new screen (and each new step) is encountered. The duration over which the text is flashing should be long enough so that there is a high probability that the user will notice, but not so long as to be considered annoying to the user, where in practice, a duration in the range of 2–4 seconds is preferred.

A further improvement to the user interface and workflow outlined in detail above can be achieved by using audio instructions in combination with the written instructions described above. For example, a simple verbal script corresponding to the written instructions could be played as each screen appears.

The incorporation of a compositing algorithm to build an interleaved image file from the individual views of the motion sequence is a further enhancement to the user interface system. Compositing techniques to form images suitable for viewing through lenticular screens for motion or other types of lenticular imaging applications are well known. Placing such capability in the user interface system takes advantage of the processing power inherent in the system and produces image files in final form for lenticular printing, saving the cost of doing interleaved image building in a case where remote lenticular image printing is done, or making possible on-site lenticular print fulfillment.

The usefulness of a kiosk having a user interface for motion card prints can be expanded by combining a printer means with the kiosk so that prints can be delivered to customers on demand after they complete the image selection process described above. A printer can produce standard flat 2D images from the captured video frames and/or a lenticular printer capable of, for example, printing on a lenticular card sheet which can be used to produce the motion card. Standard 2D printers include full page resistive head thermal printers, scanning resistive head thermal printers, thermal wax transfer printers, ink jet printers, electophotographic printers, and silver halide printers and the like.

The usefulness of a kiosk having a user interface for motion card prints can be further expanded by combining an electronic camera means for capturing live images at the kiosk. The camera means is preferably capable of capturing images at video rates. Such live capture means together with a motion card image selection and preview with adjacency effects, when combined with a interleaved image building capability, makes possible the delivery of custom motion image cards from live images capture at the kiosk. Such capability is particularly well suited to application in entertainment venues. Most preferred is the combination of a user interface including preview, an electronic camera, and a printer.

The invention has been described with reference to a preferred embodiment; However, it will be appreciated that variations and modifications can be effected by a person of ordinary skill in the art without departing from the scope of the invention.

PARTS LIST 10 kiosk-based system
11 credit card reader
12 touch screen display
14 video tape player
16 receipt printer
18 speakers
20 motion card delivery slot
22 processor (CPU)
24 printer
26 camera
30 blank lenticular cards
70 step 1
80 step 2
82 video window
84 eject and exit action button
86 next button
88 preview button
90 step 3
92 start over button
94 submit order button
96 slider control
100 step 4
110 step 5
120 step 6

What is claimed is:

1. A method of forming a hard copy motion card from a captured video motion sequence, comprising the steps of:
   a) displaying a video motion sequence, and selecting a series of motion containing views from said motion sequence, wherein each of the views corresponds to a distinct image at a specific period of time;
   b) programmably temporally subsampling the selected motion views based on selected beginning and end views;
   c) calculating the adjacency effect of adjacent temporally subsampled motion containing views according to the following equation $$Is_n = \sum_{m=-j}^{+k} \alpha_{n-m} I_{n-m} \qquad \text{Equation 1}$$

where $I_{n-m}$ is the (n-m)th image of the captured sequence and the $\alpha_{n-m}$ is a coefficient that describes fraction of the (n-m)th image that contributes to the image as it is actually viewed when attempting to view the nth image;
   d) displaying the temporally subsampled views with the calculated adjacency effects as will be viewed on a motion card; and
   e) printing the adjacent motion containing views as an interleaved image on a printing medium forming a hard copy motion card such that the selected motion containing views can be viewed in sequence by altering an angle between a viewer's eyes and a lenticular or barrier screen located on the printing medium.

2. A method according to claim 1 wherein the interleaved image is displayed on a monitor in a manner which simulates the viewing of the printed interleaved image as a transmissive or a reflective type so as to match the to be formed hard copy motion card.

3. A system for forming a motion card from frames of video, comprising:
   a kiosk and included within said kiosk; a video source, a processor for receiving a sequence of video frames from the video source, said processor calculating data for displayable images and associated adjacency effects, a display responsive to the calculated data for previewing a selected sequence, of video frames as a motion sequence means for programmably temporally subsampling the selected motion views based on selected beginning and end views, means for calculating the adjacency effect of adjacent temporally subsampled motion containing views according to the following equation $$Is_n = \sum_{m=-j}^{+k} \alpha_{n-m} I_{n-m} \quad \text{Equation 1}$$

where $I_{n-m}$ is the (n-m)th image of the captured sequence and the $\alpha_{n-m}$ is a coefficient that describes fraction of the (n-m)th image that contributes to the image as it is actually viewed when attempting to view the nth image and interactive means for enabling a user to select video frames from the displayed selected range of video frames for display as if formed on a motion card, and editing means in conjunction with said processor for enabling the user to reselect video frames from the sequence of video frames for display as if formed on a motion card; and a printing means for printing the selected frames in an interleaving manner on either a card sheet affixed to the back of a lenticular sheet or directly to the back of a lenticular sheet so as to provide a motion card that replicates the motion sequence previewed on the display.

4. The system according to claim 3 wherein said video source is an electronic camera for capturing frames of video.

5. A system for forming a hard copy motion image from a video motion sequence recorded on a video recording means which contains views from a source, comprising:

means for playing the video recording means and viewing views recorded thereon;

means for selecting a series of motion containing views from said motion sequence, wherein each of the views corresponds to a distinct image at a specific period of time;

means for programmably temporally subsampling the selected motion views based on selected beginning and end views;

a storage device for storing the selected motion containing views;

means for calculating the adjacency effect between the stored selected motion containing views according to the following equation;

means for calculating the adjacency effect of adjacent temporally subsampled motion containing views according to the following equation $$Is_n = \sum_{m=-j}^{+k} \alpha_{n-m} I_{n-m} \quad \text{Equation 1}$$

where $I_{n-m}$ is the (n-m)th image of the captured sequence and the $\alpha_{n-m}$ is a coefficient that describes fraction of the (n-m)th image that contributes to the image as it is actually viewed when attempting to view the nth image means for displaying the views in sequence incorporating the calculated adjacency effects; and a processor for creating an interleaved image from the selected views, which interleaved image when printed on a printing medium will allow a viewing of the selected motion containing views in sequence by altering an angle between a viewer's eyes and a lenticular or barrier screen located on the printing medium.

6. The system according to claim 5 and further comprising an electronic camera acting as a source for capturing frames of video.

7. A system for forming a hard copy motion image from a video motion sequence recorded on a video recording means which contains views from a source, comprising:

means for playing the video recording means and viewing views recorded thereon;

means for selecting a series of motion containing views from other views while viewing the views, wherein each of the views corresponds to a distinct image at a specific period of time;

a storage device for storing the selected motion containing views;

processor means for calculating the adjacency effect between the selected motion containing views;

means for displaying the stored selected motion containing views and the calculated adjacency effect in sequence;

means for a user to indicate whether the user wishes to form an interleaved image from the selected views;

a programmed processor responding to the means for a user to indicate, create an interleaved image from the selected views which interleaved image when printed on a printing medium will allow viewing of the selected motion containing views in sequence by altering an angle between a viewer's eyes and a lenticular or barrier screen located on the printing medium; and an instruction sequence displayed on the display means for instructing a user to play the video recording means in the means for playing and to activate the means for selecting a series of motion views when viewing views desired to be made part of the hard copy motion image, and to indicate whether the user wishes to form an interleaved image from the selected views.

* * * * *